US012737340B2

(12) United States Patent
McGhan et al.

(10) Patent No.: US 12,737,340 B2
(45) Date of Patent: Sep. 15, 2026

(54) REPOSITORY-BASED STATE DIFFING SYSTEM AND MIGRATION SCRIPT GENERATING SYSTEM FOR DATABASES

(71) Applicant: ORACLE INTERNATIONAL CORPORATION, Redwood Shores, CA (US)

(72) Inventors: Daniel McGhan, Fort Mill, SC (US); Yaroslav Shamatienko, Vinnytsia (UA); Alexander Kluev, Oakville (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/921,351

(22) Filed: Oct. 21, 2024

(65) Prior Publication Data

US 2026/0044487 A1 Feb. 12, 2026

Related U.S. Application Data

(60) Provisional application No. 63/679,666, filed on Aug. 6, 2024.

(51) Int. Cl.
*G06F 16/22* (2019.01)
*G06F 16/25* (2019.01)

(52) U.S. Cl.
CPC ........ *G06F 16/2272* (2019.01); *G06F 16/258* (2019.01)

(58) Field of Classification Search
CPC ........................... G06F 16/2272; G06F 16/258
USPC ........................................................ 707/696
See application file for complete search history.

(56) References Cited

U.S. PATENT DOCUMENTS 6,473,794 B1 * 10/2002 Guheen .................. H04L 43/50 709/224
2013/0152061 A1 * 6/2013 Golde .................... G06F 8/423 717/143
2014/0032111 A1 * 1/2014 Strassenburg-Kleciak ................. G01C 21/387 701/533
2015/0222431 A1 * 8/2015 Guido van Rossum .................... H04L 63/1441 380/46
2016/0210342 A1 * 7/2016 Vallabhaneni ...... G06F 11/3034
2017/0235848 A1 * 8/2017 Van Dusen ........ G06Q 30/0201 705/12

(Continued)

OTHER PUBLICATIONS

Introduction to Liquibase, Retrieved from https://docs.liquibase.com/concepts/introduction-to-liquibase.html [retrieved on Oct. 2, 2024] (3 pgs).

*Primary Examiner* — Kuen S Lu
(74) *Attorney, Agent, or Firm* — Kraguljac Law Group LLC

(57) ABSTRACT

Systems, methods, and other embodiments associated with a repository-based state diffing system and migration script generating system for databases are described. In one embodiment, the state diffing system includes an export function configured to automatically control placement of selected objects from a development database into a repository based on at least placement rules that specify a folder structure and locations for different types of objects. In one embodiment, the state diffing system includes a diffing function which compares the state of the database in two different branches and then generates executable scripts that be used to migrate a target database from one state to the other.

17 Claims, 4 Drawing Sheets

(56) References Cited

U.S. PATENT DOCUMENTS

2020/0192650 A1* 6/2020 Santosuosso ......... G06F 9/5072

* cited by examiner

REPOSITORY-BASED STATE DIFFING SYSTEM AND MIGRATION SCRIPT GENERATING SYSTEM FOR DATABASES

CROSS REFERENCE TO RELATED APPLICATIONS

This disclosure claims the benefit of U.S. Provisional Patent Application Ser. No. 63/679,666 filed Aug. 6, 2024, titled "State Diffing-Based Migration Script Generating System for Databases," and assigned to the present assignee, which is incorporated by reference herein in its entirety.

BACKGROUND

Throughout a Software Development Life Cycle (SDLC), database development projects, such as those that rely heavily on code inside a database, are more challenging to manage than stateless mid-tier projects. Examples of projects may include those that use Oracle Database, Oracle Application Express (APEX), or other database systems.

For example, when a developer modifies a table to add a new column of data or a new field, this modification needs to be correctly reflected in the associated database. A developer that modifies code without proper migration strategies can cause issues when moving from one database version to another. If migrations are not applied in the correct order, databases can become out of sync, leading to missing fields, tables, or incompatible data structures.

Prior techniques involved redefining a Java class with the new data. But with a database system, that is not sufficient and does not work. A specific script is needed to alter database tables and put that into a repository. Furthermore, different developers have different coding styles, different coding preferences, use different formats in code, and store contents into the repository in different locations, which are inconsistent with how other team members create and store code modifications. This creates many technical challenges when attempting to correctly deploy contents from the repository to a target database because the modifications are not created in a consistent manner. A deployment system cannot recognize and/or identify modifications correctly when the modifications are made in random techniques and/or styles. This may lead to database schema mismatches, runtime errors, data loss, and/or other errors with the target database.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
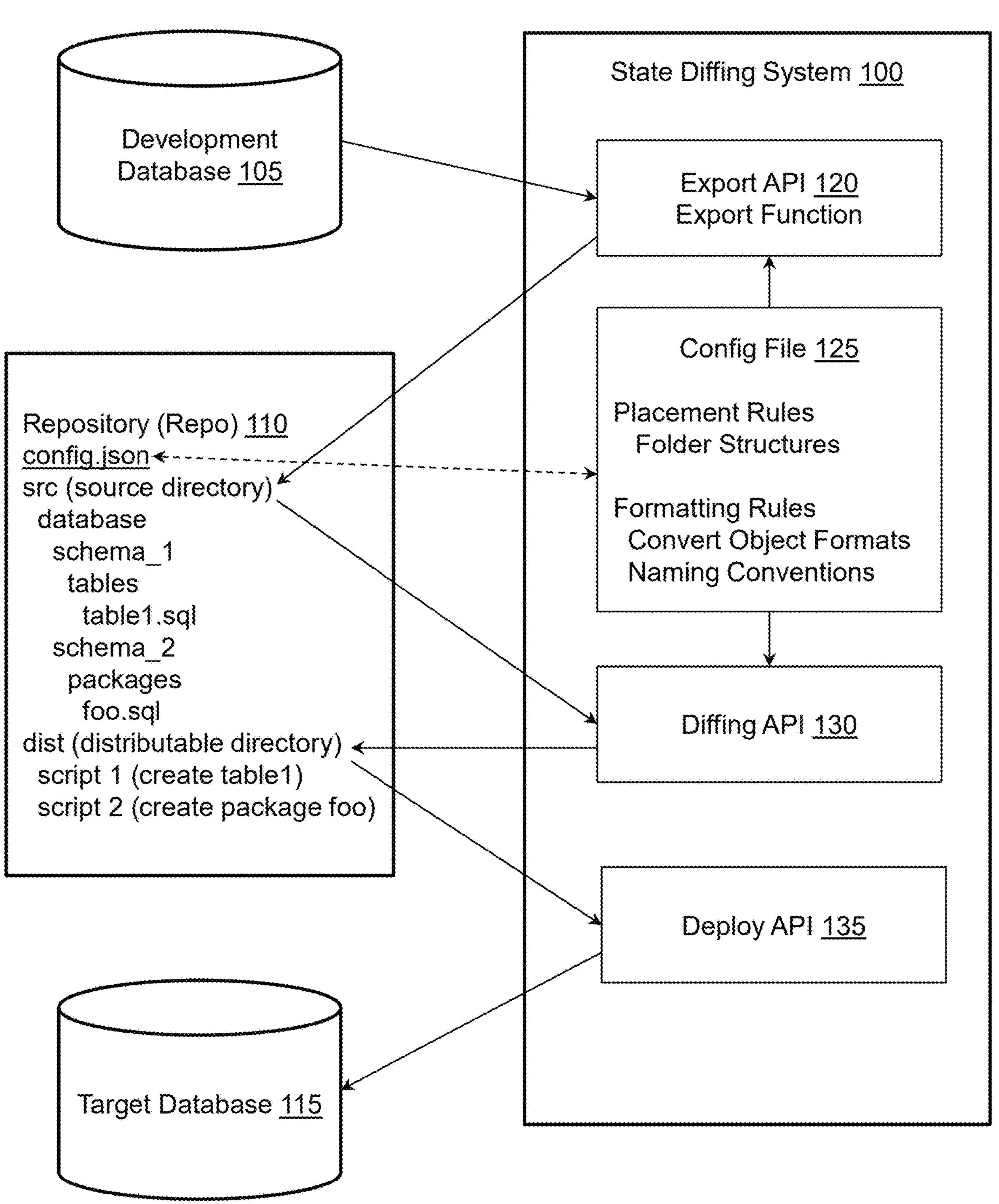
FIG. 1 illustrates one embodiment of a state diffing system associated with migrating contents from a development database to a repository.

Systems and methods are described herein that provide a repository-based state diffing system for databases to assist with database migrations from a development environment to a repository, and then to a target database. For database development, the present system provides automated control mechanisms to merge new code into existing code to assist in the software development process.

In one embodiment, the state diffing system may also be configured to generate a migration script(s) for databases. A migration script defines changes to a database, allowing developers to version control their database and ensure it evolves in sync with application code. The migration scripts allow a database system to maintain consistency between development, testing, and production environments.

In one embodiment, the present state diffing system may be configured to automate various parts of a database developer's workflow. The state diffing system may export objects from a development database, put the objects in a repository (also called "repo") in correct locations, and then reformat the objects according to rules associated with the repo. The state diffing system may be configured to compare the state of database objects in different Git branches, typically a feature branch to the main branch, and generate a set of database scripts that migrate the database from the development branch state to the feature branch state.

In one embodiment, the present state diffing system is configured to function as a database object-to-repository assistant. It controls the exporting of database objects to a repository, ensuring that code changes and new database features created by development team members are kept in sync. Additionally, the state diffing system may be configured to maintain the repository, and its stored contents, in a consistent and uniform order by converting non-standard code into a standardized format.

One advantage of the present state diffing system is that stylistic preferences of different team members may be reduced and/or eliminated to facilitate a more standardized and uniformed repository of database objects of a software system. The standardization and uniform organization of the repository further improves the ability to deploy a software project to a target database.

Furthermore, based on determining changes between branches, the system may automatically generate one or more migration scripts to show how the branches changed from state A to state B. This, along with the converted standardized content, reduces possibilities of script errors and/or syntax errors in such migration scripts that were created by previous tools.

Definitions

State diffing in computer science refers to a process of comparing two states to determine the differences between them. This technique is often used in various domains, such as version control systems, user interface libraries, and data synchronization.

Software Development Life Cycle (SDLC) refers to a systematic process used by software development teams to design, develop, and test software.

Git refers to a distributed version control system used for tracking changes in source code during software development. For example, Git tracks changes in files and allows multiple developers to work on the same project simultaneously without overwriting each other's changes.

A commit is a snapshot of a project at a given point in time. Each commit may have a unique identifier and can include a message describing the changes made.

A Git repository, also referred to as a "git repo," as used herein (but not limited to), is a storage space where a project's files, along with their complete revision history, may be kept. The repository allows a user to track changes, collaborate with others, and manage different versions of a project efficiently.

Branching in a repository, as used herein (but not limited to), allows a user to create, manage, and work on multiple lines of development within the repository. Branching facilitates parallel development, experimentation, and collaboration by enabling the user to create isolated branches for different tasks or features. Branches allow a user to work on different versions of a project simultaneously. The "main branch" represents the current state of a target database. New branches in the repository can be created for new features (e.g., feature branch), bug fixes, or experiments. The main branch is the "target branch" for merging new features or code changes that will be applied to the target database.

System Embodiment

With reference to FIG. 1, one embodiment of a state diffing system 100 is illustrated that is associated with controlling migration of database objects from a development database 105 to a repository (repo) 110. In another embodiment, the state diffing system 100 may be configured to assist in the deployment of objects from the repo 110 to a target database 115.

In one embodiment, the system 100 may be implemented as part of a computing system with one or more computing devices including at least one processor connected to at least one memory. The state diffing system 100 may be configured with executable instructions stored on a non-transitory computer readable medium that when executed by at least the processor cause the computing system to perform the functions or combinations of functions described herein. The functions include functions to migrate objects from a developmental database to a repository, for example. One or more components of FIG. 1 are operably connected to facilitate data communication therebetween.

In general, as software developers create and modify features and objects of a database system that is being developed, those features/objects are contained in the development database 105. The features and objects may include database changes such as schema updates, new tables, and/or modified table columns. At some point, those features and objects are migrated to the repo 110. Migrating the changes to the repo 110 allows developers to trace the history of database changes, understand why a change was made, and/or easily revert to previous versions if problems arise. The repo 110 also functions as a central repository to ensure that everyone works from the same set of database changes, reducing the risk of conflicts or data inconsistencies. Storing database migrations in the repo 110 also allows the development team to run automated tests against a consistent database state. This makes it easier to test new features, validate data integrity, and identify issues before changes reach production.

However, the features and objects from the development database 105 should not be randomly transferred to the repo 110, which some prior systems allow users to do. If database changes are scattered throughout the repository 110 or stored in inconsistent locations, it can create confusion, slow down development, and increase the likelihood of errors.

In one embodiment, the state diffing system 100 includes an export function that is accessed and initiated by an export API 120. The export function is configured to control the migration of features and objects from the development database 105 into defined, structured locations in the repo 110. In one embodiment, the repo 110 is configured based on branching. This is similar to a file system that includes folders and sub-folders for storing files, objects, tables, and other components of a database system being developed in different branches.

For example, in one embodiment, the repo 110 may be configured as a git repository that uses branches. Branches are used to isolate development work, manage features, and coordinate multiple developers working on the same project. Placing new features or updated code in specific branches allows the development team to run tests in isolation from other branches. When new database features are part of an application update, having them stored in specific repository branches makes it easier to roll out those features gradually. For example, developers can introduce database changes incrementally based on a particular feature branch, applying only what features are targeted in a database environment at an appropriate time. This allows for more controlled and phased feature rollouts, reducing the risk of deploying unfinished or untested changes.

In one embodiment, the export API 120 may be accessed via a command line interface. When a developer wishes to export modified objects to the repo 110, an export command designated for the export function is entered and submitted via the command line interface. For example, the export command may have a syntax and format of "Export [objects]". This is further described below. The export command initiates the export function of the system. The system is then caused to capture the "state" of the database being developed. In one embodiment, the export function may be initiated to move and control placement of a developer's changes from the development database 105 into defined source (SRC) folders with all associated objects of the development database 105 that are involved in the changes.

The export function may also ensure that the objects are in sync with other developer's objects and changes. For example, the state diffing system 100 may include a versioning system (e.g., using timestamps or sequential numbers). This may be used to track changes to the database schema or data. Each migration/export to the repo 110 represents a discrete set of changes (e.g., adding a table, altering a column, updating data), and these migrations are stored as files in the repository 110.

With continued reference to FIG. 1, in one embodiment, the state diffing system 100 (via the export function) is configured to export database objects based on a config file 125 that is shared with a set of users that are working together on a project and using the repo 110. The set of users may be the development team working on the database system. The config file 125 may be part of and/or contained in the repo 110 as a file. An example config file is shown in the repo 110 as "config.json" above the "src (source directory)."

In one embodiment, the state diffing system 100 (via the export function) is configured to locate and access the config file 125. This may be performed based on a default location such as "repository/config.json" or may include variables that specify a custom location. File system functions may be used to open and/or access the contents of the config file 125, which include a set of rules as discussed below. In one embodiment, the repo 110 is maintained in a cloud system/service or a remote server. Accessing the config file 125 may involve using API calls and/or other network communications. The contents of the config file 125 may then be loaded into memory and parsed into a usable data structure, where the set of rules are identified and/or extracted for use.

In one embodiment, the config file 125 includes the set of rules that are defined to control how objects are exported and placed in the repo 110 (e.g., placement rules). The config file 125 may also include a set of rules to control how the objects are formatted (e.g., formatting rules). The placement rules in the config file 125 create a systematic/programmatic mechanism for the export function to control the placement of files/objects into the repo 110 in a consistent organization that does not rely on user subjectivity.

The formatting rules may be defined to automate actions performed that analyze and convert object formats (e.g., reformat) into a consistent and uniform manner (e.g., standard format). The formatting rules may define naming conventions (e.g., defined names for folders and/or files). The formatting rules may also reformat exported code based on specified code structure and/or syntax. This modifies the exported code so that all exported code will have a more uniform and standardized format. In one embodiment, the config file 125 may be created with a default set of rules but may be customized with different rules.

For example, the placement rules in the config file 125 may define that define a default folder structure and folder hierarchy based on a main source directory such as a directory named "src" or other designated name. The placement rules may define default locations where particular database objects will be stored based on object type. For example, the placement rules may define a specific folder and/or subfolder that tables are stored in the repo 110, a specific folder/subfolder that packages are stored in the repo 110, a specific folder/subfolder that views are stored in the repo 110, etc. Thus, the placement rules may define which folder(s) in the repo 110 are designated for specific types of files and objects based on the file type and object type being exported, respectively. For example, a rule may designate that an altered table goes in a certain folder, which is an expected location for altered tables.

Accordingly, the export function may be configured to identify the type of file/object being exported and to automatically control placement of the files/objects within the repository 110 based on the placement rules that specify a repo location (e.g., default location) for a particular type of file/object. Thus, different types of files/objects are placed in different designated folders or locations to ensure consistent placement. This also ensures that specific files and objects are located in expected locations, where the system expects to find them when a deployment is initiated to correctly deploy the files/objects into the target database 115.

Thus, the present diffing system 100 with its placement rules and formatting rules keeps all developers of a software team in sync with respect to how files and objects from the development database are exported and maintained in the repo 110. When a new developer joins the team, they do not have to learn the organization or hierarchical structure of the repo 110. Users/developers simply use the export API function 120 on any files that have been changed in the database 105. The present system 100 automatically handles the organization and placement of files as the developers work on a project simply by using the present export API function.

This is one advantage of the present system over previous techniques because developers would previously store and organize their software files in their own desired locations and would format code with their own preferences. Thus, there was no consistent manner of locating files or formatting files, which made it very difficult or even impossible to determine state changes between code in files or objects.

Another advantage of the present export function is that the controlled and structured organization reduces possible errors for migration scripts that are executed on the repo 110. In general, migration scripts are typically applied in a specific order to maintain the integrity of the database. Storing the features and objects in a structured, ordered manner within the repository 110 ensures that migrations scripts can be generated in an automated manner without errors since the structure is known and file/object locations are in expected locations. The migration scripts may also be applied sequentially in the correct order.

In one embodiment, state diffing system 100 may include a diffing API 130. After a feature or other objects have been exported to the repo 110, a user/developer can execute a diffing command via the diffing API 130. For example, the diffing API and system 100 are configured to automatically calculate what are the changes and differences in the code/objects (the contents), generate scripts that can take the database from the previous state to the new one, then place the scripts into a distribution folder (e.g., "dist" folder in the repo 110). The distribution folder may then be deployed to the target database 115. The diffing API 130 is described with reference to FIG. 3.

In another embodiment, the state diffing system 100 may include a deploy API 135. The deploy API 135 may be configured to deploy content into the target database. This is described below.

Export Function API Embodiment

Figure 2:
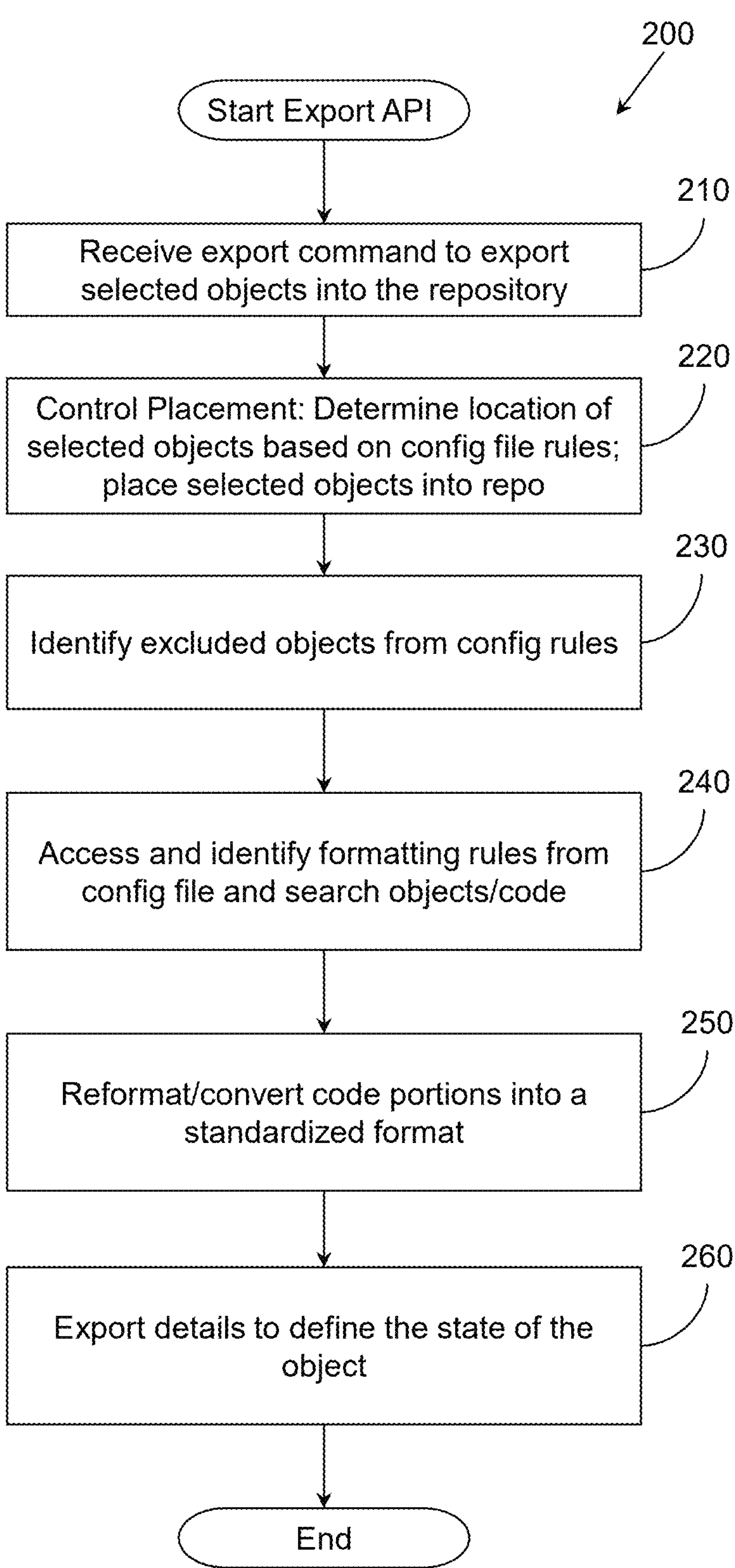
FIG. 2 illustrates one embodiment of a method associated with exporting contents from a development database to a repository.

With reference to FIG. 2, one embodiment of method 200 is shown that is associated with the state diffing system 100 and the export API 120 from FIG. 1.

At block 210, an export command is received via the API that initiates the export function. As previously described, the present export function is part of the state diffing system 100 (FIG. 1) and is configured to export selected objects of a database feature to a repository in a structured manner. For example, the export function is configured to cause the computing system to export the selected objects from the developmental database 105 to the repository 110 (seen in FIG. 1). In one embodiment, the present diffing system 100 may be implemented with a command line tool via a command line interface (CLI) to initiate and perform the functionality described herein.

For example, the export command may be "Export [object(s)]" where [object(s)] identifies what is to be exported. For illustrative purposes, the command "Export Table1" is described. The state diffing system 100 identifies the object to export from the development database 105 and will export the identified object to the repo 110, in this case Table1. Of course, the export command may request to export multiple objects, one or more database features, or other portions of a database system from the development database 105. In these examples, the term objects is used in general to include objects, files, code, features, and/or other types of components that may exist in a software system being developed.

At block 220, the system automatically controls placement of the selected objects into the repository. For example, the system determines a location (e.g., a branch location) within the repository 110 to place the selected objects based on at least the placement rules that specify a repo location for different types of objects. Based on the type of objects, the selected objects are stored into the repository in their designated locations.

For example, the placement rules may specify where tables are stored such that the object Table1 is placed into the repo 110 based at least on the config file rules. For example, the system determines where Table1 is currently located and what folder owns Table1. Using the example folder structure shown in repo 110 in FIG. 1 (reproduced below), the system determines that Table1 is owned by "schema_1" (parent folder) and is under "tables" sub-folder:

| src (source directory) |
|---|
| database |
| schema_1 |
| tables |
| table1.sql (create table sql/ddl, including SXML from dbms_metadata) |
| indexes |
| schema_2 |
| packages |
| foo.sql |

For example, the config file rules may define an export process that may cause the system to connect to the database associated with Table1 (e.g., via network communications) and locate that Table1. By default, Table1 may be placed in folder src/database/schema_1/tables/table1.sql. This may be a default rule in the config file. The system accesses the config file 125 to determine if any placement rule(s) exists to control the placement of Table1 in a particular folder location. Table1 is then placed into the repo 110 according to the config file rules.

As previously explained, in one embodiment, the config file rules including the placement rules define a folder structure and which folder(s) in the repo 110 are designated for different types of files/objects based on the type of the file/object being exported. Accordingly, the export command and its export function are configured to automatically control placement of the selected objects within the repository 110 based on at least placement rules that specify a repo location for different types of objects. This ensures a consistent and uniform placement of files/objects into the repo 110 in a standardized manner.

At block 230, the system may identify if any exclusion rules exist that will cause certain objects to be filtered out. If any objects being exported are identified as excluded objects in the config file rules, then those objects are filtered out and are not placed into the repo 110. In one embodiment, for example, in a development environment, there may be supporting objects that are not meant to be deployed from the repo 110 into the target database 115. Thus, filter rules may be defined to exclude such supporting objects so that they are not accidentally included into the repo 110. Since filtered objects are not present in the repo 110, they are automatically excluded from being transferred/deployed to the target database 115. Thus, the filter rules allow different teams and different projects to control what will get deployed and what will not get deployed, which is customizable.

At block 240, the system accesses the config file 125 and loads the formatting rules into memory. The formatting rules are identified from the memory and applied to the files, objects, and/or code of any exported objects. In one embodiment, the config file 125 may include pointers that point to a file that defines the formatting rules (e.g., using SQL command line (CL) formatting command) to format the exported objects and/or code in a consistent manner.

In one embodiment, the state diffing system 100 may include a formatting function that is executed as part of the export function. The formatting function uses the formatting rules of the config file 125 to automatically reformat code being exported into the repo 110 in a consistent standardized manner. For example, a code parser and/or code libraries may be used to search the code and identify items or components of code that are designated for formatting.

For example, the formatting rules (e.g., via the code parser) may search for certain items/components of code such as SQL statements (e.g., create table, create package, etc.) in the exported code and identify the structure and/or coding syntax that is used. The formatting rules may specify rules for reformatting/converting the code into a designated standard format. Different types/components of code may have a particular designated format based on its type. Thus, a particular type of code that appears in multiple different files/objects will be reformatted to have a consistent format across all the different files/objects.

The formatting rules may specify designated formats such as, but not limited to, standard indentation sizes, use of spaces, keywords, what names are to be in upper case words or in lower case words (e.g., table names are in uppercase), specify an order of certain constraints or parameters for particular command statements, etc.

At block 250, the formatting rules applied to the exported code allow the formatting function to identify which portions of the code do not comply with the formatting rules and then reformat those portions into the designated format. The reformatting standardizes the style of the code to make the code in the repo 110 have a consistent and standardized format, structure and/or appearance.

For example, one rule may specify that an Alter Table command should be in capital letters and constraints should be in an order such as constraint A, constraint B, constraint C. Some programmers may use this format, but others may not. When an Alter Table command is found in a portion of code that does not have the designated format such as, "alter table X" with an order of constraints as constraint B, constraint C, and constraint A, the code is reformatted to "ALTER TABLE X" with constraints in the order of constraint A, constraint B, constraint C. Even though the functionality of the original code is the same as the reformatted code, the original code looks as though it might be functionally different. The reformatting rules may define orders for certain commands so that the original code is modified to have the command statements and constraints appear consistently. The reformatted code is then stored in its designated location in the repo 110.

Thus, it does not matter which person wrote the code or what style the code is written in. The formatting rules modify specified appearance properties, syntax, code structure, and/or other properties of the code to convert the code into a standardize format. The standardized format ensures that the code is more easily usable, readable, and understandable by other users. In general, the reformatting rules take away a developer's unique style of coding, not the functionality of the code. The modified code that is stored to the source SRC folder in the repo 110 is functionally equivalent to the original code but is formatted differently.

One goal of the reformatting is to simplify the code review process by making exported code within the repo 110 look the same in appearance and structure. The reformatted code makes it easier for a reviewer to focus on and identify functional changes in the code rather than being distracted by stylistic preferences in the code. Stylistic preferences can make similar functional code look very different from a previous version and/or may make a minor coding change look as though many lines of code were changed.

During a review process, one or more team members may review the changes made to the code, provide feedback, and request modifications if needed. Once the modified code is reviewed and approved, the changes are ready to be deployed into the target database 115, which is discussed in the following diffing command.

At block 260, the system exports sufficient state details that define the state of the object (and/or other objects involved) at a point in time in a way that can be made actionable when comparing the same object to itself at a different point in time. For example, the system captures relevant information about the associated feature branch and/or objects (e.g., a file, commit, or entire repository) so that it can be accurately compared to its state at a different time or after changes. This may include, but is not limited to, capturing and exporting a commit history to track changes that identify when specific features were added, modified, and/or deleted, and that history may identify differences, transitions, and/or evolution of the code. Tags and versions may be provided, which define a reference point that can be revisited later. This allows for the system or another system to identify and determine that exact state in a subsequent process in the future, such as during a deployment process. The exported state details are advantageous to the deployment system for accurately determining the state changes and simplifies the process.

The exported state details about the object state may include diffs (differences) in one embodiment. The diffs between commits allows the system to see exactly what specific code changes have been made. This is useful for code reviews and for understanding what will be deployed. The exported details about the object state may also include branch structure. This information helps to understand the relationship between branches (like main, feature, and hotfix branches). This in turn helps in assessing how changes will impact the overall project when the feature branch is merged.

In general, the exported state details may be selectable and configured to include object state information and historical data about a feature branch and the object(s) involved at a point in time. The state details are selected to provide sufficient information for a comparison function that may be executed to make subsequent comparisons of the same objects (at different states/times) more easily executable, more accurate, and straightforward. The state details may be exported into a data structure and stored in memory and/or a storage device that can be accessed by network communications and used by the system (e.g., via an operable connection). In one embodiment, the comparison function may be part of a diffing command, and the exported state details may be accessed and used by the diffing command, which is described below.

Diffing Command API and Script Generating Embodiment

Figure 3:
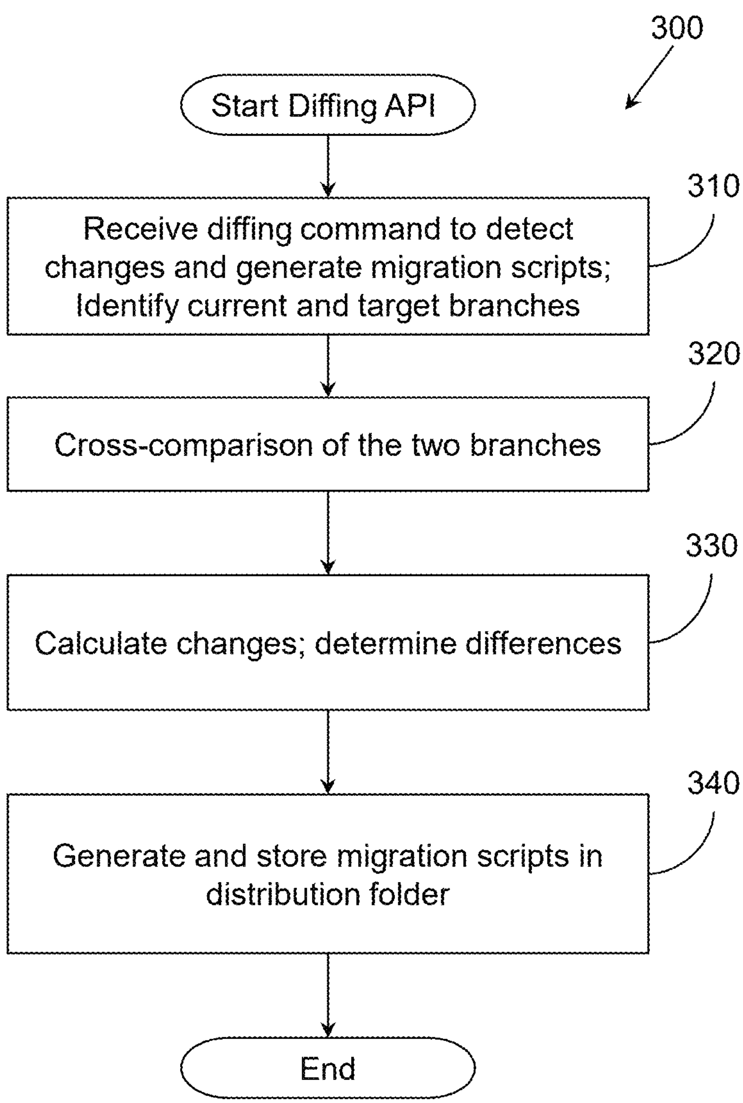
FIG. 3 illustrates one embodiment of a method associated with a diffing command API for deploying contents from the repository to a target database.

With reference to FIG. 3, one embodiment of method 300 is shown that is associated with the diffing API 130 from FIG. 1. After a feature or other objects have been exported to the repo 110 and approved, a user/developer can execute the diffing command via the diffing API. The diffing API 130 and system 100 are configured to automatically calculate what are the changes and differences in the code/objects (the contents), generate scripts that can take the database from the previous state to the new one, then place the scripts into a distribution folder (e.g., "dist" folder in the repo 110). The distribution folder (also called distributable directory) may then be deployed to the target database 115.

A developer may use the diffing API 130 to generate code (e.g., scripts) that can change the state of target database(s) in the target database 115 to match the state of the repo 110. This is done by, for example, comparing the state of the database in two different branches of the repo 110 to determine changes and generate script commands to transform the state of the target database to reflect the new/modified state that includes the changes.

In general, the diffing command is configured to operate on a repository that includes branches. A target branch is the main branch, which is the branch (including its object contents) that will be ultimately deployed to the target database 115. The target branch represents the current state of the target database, which is the latest stable version of the codebase and is where completed and reviewed features are merged. The contents of the main/target branch are what will be deployed to the target database 115. In general, the main branch acts as the primary source of truth for the code that gets deployed to the target database. The deployment process involves pulling the latest code from the main branch and deploying it to the target database 115. In one embodiment, this may involve deploying to production servers.

As previously stated, branches are used to isolate development work, manage features, and coordinate multiple developers working on the same project. For example, an updated feature for a database system may be contained in one or more feature branches in the repo 110. Executing the diffing API command based on the updated feature branch will cause the system to generate database migration scripts which are later merged into the main/target branch to prepare for deploying the new feature into the target database 115.

At block 310, the system receives a diffing command via the diffing API 130 (FIG. 1) to prepare a selected feature from a feature branch in the repository to a target branch. This may be received via a command line interface, for example. Receiving the diffing command triggers execution of the following functions. The system identifies the current feature branch (from the repo 110) that is designated by the diffing command and identifies the corresponding main/target branch.

At block 320, the system compares the main/target branch to the current feature branch and performs cross-comparisons. In one embodiment, the system may access and use the data structure that contains the state details that were previously exported for the feature branch. In one embodiment, the tool "git diff" may be used. From the comparison of the two branches, the system is attempting to identify changes to the contents (e.g., files, specific code) under the SRC source folder across those two different branches: the feature branch and the target branch.

In one embodiment, performing cross comparison may include, but is not limited to, functions to identify folders in the current feature branch, identify objects, identify other content, etc. Then, compare the identified contents of the current feature branch to target branch objects and identify what files were added, removed, and/or modified, and what specific code was added, removed, and/or modified. The cross comparison identifies how contents in the current feature branch and contents in the target branch changed states. The system may then generate scripts that can migrate a database from the previous state (of the target branch) to the state of the feature branch, which is described as part of block 340.

For example, if a new file exists in the current feature branch that does not exist in the main/target branch, then that means somebody added that new object in the feature branch and then exported it to the repo 110.

The system will create or add the new file/object when the system generates this issue. So, when the user runs the present diffing command, the system creates an issue folder and performs a cross comparison. If anything new (e.g., a new table) in the repo SRC is identified that needs to be created, the system generates a CREATE script and places the contents of that file under the issue folder. In one embodiment, the CREATE script may be a copy of a file in SRC.

If files or objects have been deleted, then the opposite process is performed. In other words, if an object existed in the main/target branch, but it no longer exists in our current feature branch, that means that the developer removed something as part of their current work. And thus the system identifies the deleted object(s) and will generate a DROP script to remove the object(s) from target environments.

If files or objects exist in both branches but the contents are different, then a developer must have made a change in the feature branch. In this case, system identifies the modified object(s) and generates an ALTER script to update the objects in target environments. In general, the CREATE script, DROP script, and ALTER script are examples of migration scripts that may be generated during this process.

At block 330, after cross-comparison, content changes between the branches are calculated and determined. The identified content changes may then be stored in a distribution folder (e.g., Dist folder, distributable directory), which is generated or was previously generated. In one embodiment, the stored changes may be used for sequencing and capturing state of changes over time.

At block 340, the content changes are used to automatically generate migration scripts. For example, the migration scripts are executable to change the state of a target database to match a state of the repository. The generated scripts are used to migrate a database from the previous state to the state of the feature branch, as described above.

In another embodiment, the system does not use pointers to files in the SRC because the source can change, forcing developers to revisit Data Manipulation Language (DML) scripts that were previously working. Rather, using the distribution folder to record changes and capture the state of objects over time, the system may guarantee the order of operations on the contents over time (e.g., the contents of the target branch). The changes being recorded in the distribution folder may be made as immutable once the contents are merged to main/target branch. Thus, the state of the repo 110 at this point in time is saved in the repository storage and may function as a change history. The dist folder in the repo 110 includes each state that was issued after each diffing command is executed.

Table 1 below illustrates an example distribution folder (DIST folder) that includes two states from two issues:

TABLE 1

| Distribution (DIST) Folder in Repo with Two Issues |
|---|
| Repo |
| DIST |
| issues |
| issue_1 |
| changelog.xml (order the sql files) |
| custom.sql |
| create foo |
| drop foo2 |
| alter table1 |
| issue_2 |
| changelog.xml |
| custom.sql |
| create foo3 |
| alter table1 |

For example, the content in DIST folder may have multiple ISSUE folders to record each change in the order they were made when each modification happens. This is another advantage of the present system because developers do not need to manually record their changes or create migration scripts. The system automatically generates a migration script based on cross comparisons of the two branches. This relieves developers of the most error prone and daunting tasks in a migration process.

For example, when changes are made to software applications with dozens or hundreds of tables and packages, and there are several developers with different levels of competences, the developers previously had to hand code migration scripts including all alter table scripts and alter packages scripts. This was a problem in previous techniques since these scripts depended on the developer's skill and recollection of how objects were changed, which is complex and very error prone. By using cross comparison between repository branches, the present system can systematically generate migration scripts based on identified changes in the branches.

The sequence of functions in FIG. 3 is not limited to being performed serially as depicted in FIG. 3. One or more functions may be performed in parallel or during other functions.

In another embodiment, as discussed previously, the state diffing system 100 may be configured to generate SQL commands (e.g., a migration script) to show how the branches changed from state A to state B for the changes. This may include, for example, a migration script that outlines the differences and transitions of code and/or features as they evolve over time (from one state to another). Each state represents a snapshot of the code at a particular time. The migration script is automatically generated from the results of the cross comparison of the branches involved. This reduces, for example, syntax errors and other human errors in migration scripts manually coded by the developers. The migration script is a set of SQL commands or set of scripts used to modify a database schema and data to match the requirements of new code being added to the repository. When moving new code/objects into the repository, the migration scripts ensure that the database structure and content are consistent with the application's needs.

Developers may also test the generated code and make any changes needed to complete the work on the current version of the software feature(s).

In general and in one embodiment, based on the branches in the repo and the files, the state diffing system 100 may compare the state of database objects in different repo branches (e.g., git branches) and generate corresponding code (e.g., a script) that allows the system to transition/migrate from the state in one branch to the other branch in the repo. This is an improvement over previous tools that helped with database migrations because the previous tools were insufficient, required additional network communication connections to one or more databases (making them slow), and didn't use granular export and file system layouts (making exports less useful).

In another embodiment, the export function may be configured to organize the objects in files so developers can understand and use the database objects and code in the repo. The objects are placed into separate files under a source folder, arranged in a "schema>object type" hierarchy, and formatted. This source folder and file structure represent the state of the database at a point in time. These files are intended to be included in the repo to track object evolution and to serve as the basis for migration script generation. Additionally, the objects are exported in a format that is directly usable during development. For example, a package can be modified and directly compiled into the database.

In another embodiment, with reference to FIG. 1, the state diffing system 100 may include a deploy API 135. The deploy API 135 may be configured to deploy content into the target database. For example, the system generates a deployable asset based on the contents of the distribution folder. This may include extracting the contents (e.g., folders/files) out of the DIST folder from the repo 110 and zipping or otherwise compressing the contents if desired. The resulting contents become the deployable asset for the database in the target database. The migration scripts generated from the Diffing API method 300 (FIG. 3) may be executed against the target environment to perform the deployment.

As another improvement over prior techniques, the present approach to state diffing and migration script generation compares the contents of the source directory across different branches in the repo. Scripts to migrate the database state from one branch to another are generated and placed in a separate distribution directory. The scripts are ordered and added to the tail of the list of ordered changes over time.

Prior systems do not have this concept of cross-branch comparisons of the state files as performed by the present system. The prior systems only compare files in one repository branch (or outside of the repository entirely), which may result in inaccurate results.

Another advantage in the present state diffing approaches is how the system leverages the repository branches for diffing and script generation.

Cloud or Enterprise Embodiments

In one embodiment, the state diffing system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the state diffing system is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 4:
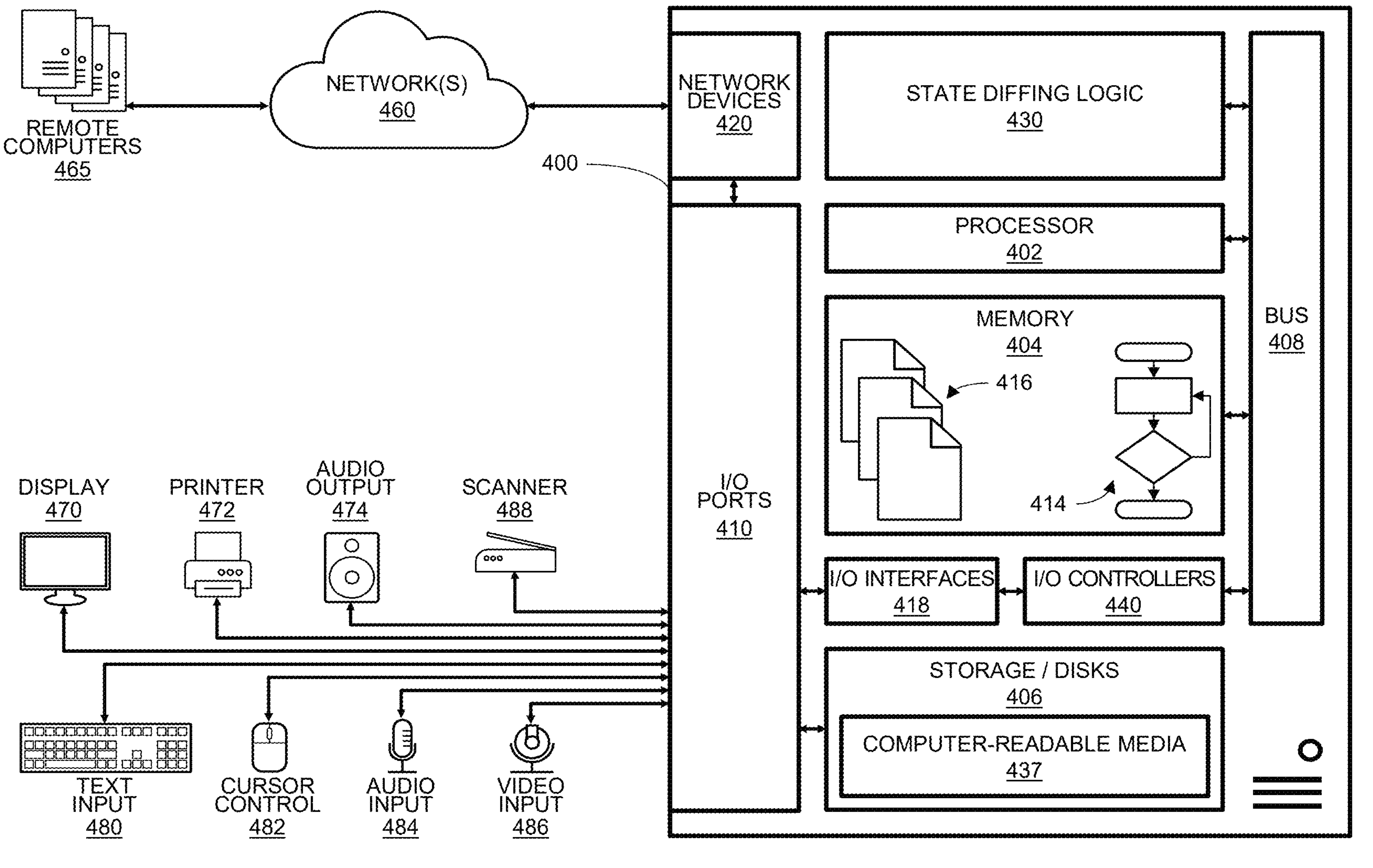
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include state diffing logic 430 configured to facilitate the state diffing functions similar to state diffing system 100 shown in FIGS. 1, 2, and 3.

In different examples, the state diffing logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the state diffing functions similar to state diffing system 100 shown in FIGS. 1, 2, and 3. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing one or more of the disclosed functions and/or combinations of the functions.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system, which are operably connected to other system components and made accessible. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which one or more communication channels are established that allow signals, data, messages, physical communications, and/or logical communications to be sent and/or received between the entities. An operable connection may include a physical interface, an electrical interface, and/or a data interface with one or more transmitters/receivers that communicate with wired and/or wireless signals. An operable connection may include differing combinations of interfaces and/or connections sufficient to establish and allow communication. For example, two entities can be operably connected to communicate signals to each other directly or through one or more intermediate entities (e.g., processor, operating system, logic, non-transitory computer-readable medium, internet communication devices, local network, etc.). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computing system cause the computing system to perform functions to migrate objects from a developmental database to a repository, wherein the functions comprising:

receive an export command to export selected objects of a database feature, wherein the export command initiates an export function that is configured to cause the computing system to export the selected objects from the developmental database to the repository;

identify the selected objects from the export command;

automatically control placement of the selected objects into the repository based on at least placement rules that specify a repository location for different types of objects;

determine a location within the repository to place the selected objects based on at least the placement rules and store the selected objects into the repository;

wherein a first type of object is stored in a first designated folder in the repository and a second type of object is stored in a second designated folder in the repository in accordance with the placement rules;

access formatting rules and apply the formatting rules to the selected objects to reformat the selected objects to have a standardized format; and export, into a data structure in the repository, state details that define a state of the selected objects at a point in time to allow comparisons of each selected object to itself at a different point in time;

in response to receiving a diffing command that is configured to determine changes between a feature branch in the repository and a target branch:

perform a cross comparison on contents of the feature branch with contents of the target branch;

determine content changes between the feature branch and the target branch based on the cross comparison;

generate a distribution folder including the content changes; and generate one or more migration scripts based on at least the content changes, wherein the one or more migration scripts are executable to change the state of a target database to match a state of the repository.

2. The non-transitory computer-readable medium of claim 1, wherein the computer-executable instructions to generate the one or more migration scripts comprises operations of:

generate SQL commands for the one or more migration scripts based on the cross comparison between the feature branch and the target branch, wherein the cross comparison determines changed states between the feature branch and the target branch.

3. The non-transitory computer-readable medium of claim 1, wherein the distribution folder is generated to record the content changes and capture a state of objects over time that indicates an order of operations on the contents of the target branch over time.

4. The non-transitory computer-readable medium of claim 1, wherein the computer-executable instructions to automatically control placement of the selected objects into the repository based on at least placement rules comprise instructions to:

access a config file that contains the placement rules;

load the placement rules into a memory;

wherein the placement rules are defined to control how objects are placed in the repository and specify default locations in the repository for placing particular types of objects;

identify one or more object types from the selected objects; and store the selected objects into the repository in the default locations based on the one or more object types.

5. The non-transitory computer-readable medium of claim 1, wherein the computer-executable instructions to access formatting rules comprise instructions to:

access a config file that contains the formatting rules;

load the formatting rules into a memory; and wherein the formatting rules automate actions performed that analyze and convert object formats of the selected objects into the standardized format.

6. The non-transitory computer-readable medium of claim 5, wherein the formatting rules include rules to automatically reformat one or more portions of code from the selected objects in a standardized manner;

wherein the one or more portions of code from the selected objects are parsed to identify items that are designated for formatting by the formatting rules; and wherein the identified items that do not comply with the formatting rules are reformatted into a designated format.

7. A computing system, comprising:

one or more computing devices including at least one processor connected to at least one memory; and a state diffing system configured with executable instructions stored on a non-transitory computer readable medium that when executed by at least one processor of the one or more computing devices, cause the computing system to migrate objects from a developmental database to a repository;

wherein the state diffing system includes an export function configured to automatically control placement of selected objects into the repository in a standardized manner based on at least placement rules that specify a folder structure and designated folder locations in the folder structure for different types of objects;

wherein the placement rules specify at least a first type of object is stored in a first designated folder in the repository and a second type of object is stored in a second designated folder in the repository based on the folder structure;

wherein the state diffing system further includes a formatting function configured to automatically reformat code from the selected objects being exported in a consistent standardized format based on a set of formatting rules;

wherein the formatting function is configured to reformat a particular type of code based on a designated format associated with the particular type of code, wherein occurrences of the particular type of code that appears in multiple objects of the selected objects is reformatted to have a consistent format across the multiple objects; and wherein the state diffing system is configured to export state details that define a state of the selected objects at a point in time for comparing each selected object to itself at a different point in time;

wherein the state diffing system further includes:

a diffing command configured to deploy a feature branch in the repository to a target branch;

wherein the diffing command is configured to:

perform a cross comparison on contents of the feature branch with contents of the target branch;

determine content changes between the feature branch and the target branch based on the cross comparison;

generate a distribution folder including the content changes; and generate one or more migration scripts based on at least the content changes, wherein the one or more migration scripts are executable to change the state of a target database to match a state of the repository.

8. The computing system of claim 7, wherein the state diffing system is configured to generate the one or more migration scripts by:

generating SQL commands for the one or more migration scripts based on the cross comparison between the feature branch and the target branch, wherein the cross comparison determines the content changes between the feature branch and the target branch.

9. The computing system of claim 7, wherein the state diffing system is configured to generate the distribution folder to record the content changes and to capture a state of objects over time that indicates an order of operations on the contents of the target branch over time.

10. The computing system of claim 7, wherein the export function to automatically control placement of the selected objects into the repository is configured to:

access a config file that contains the placement rules;

load the placement rules into a memory;

wherein the placement rules are defined to control how objects are placed in the repository and specify default locations in the repository for placing particular types of objects;

identify one or more object types from the selected objects; and store the selected objects into the repository in the default locations based on the one or more object types.

11. The computing system of claim 7, wherein the formatting function is configured to:

access a config file that contains the formatting rules;

load the formatting rules into a memory; and wherein the formatting rules automate actions that analyze and convert object formats of the selected objects into the consistent standardized format.

12. The computing system of claim 11, wherein the formatting rules include rules to automatically reformat code from the selected objects in a standardized manner;

wherein the code from the selected objects is parsed to identify items that are designated for formatting by the formatting rules; and wherein the identified items that do not comply with the formatting rules are reformatted into a designated format specified by the formatting rules.

13. A method performed by a computing system, the method comprising:

receiving an export command to export selected objects of a database feature from a developmental database to a repository:

in response to receiving the export command, initiating an export function that causes the computing system to export the selected objects from the developmental database to the repository, wherein the export function performs actions comprising:

identifying the selected objects from the export command;

automatically controlling placement of the selected objects into the repository based on at least placement rules that specify a repository location for different types of objects;

determining a location within the repository to place the selected objects based on at least the placement rules;

storing the selected objects into the repository, wherein a first type of object is stored in a first designated folder in the repository and a second type of object is stored in a second designated folder in the repository based on the placement rules;

executing a formatting function configured with formatting rules that reformat the selected objects to have a standardized format; and exporting state details that define a state of the selected objects at a point in time to allow a comparison function to compare each selected object to itself at a different point in time;

in response to receiving a diffing command that is configured to determine changes between a feature branch in the repository and a target branch:

performing a cross comparison on contents of the feature branch with contents of the target branch;

determining content changes between the feature branch and the target branch based on the cross comparison;

generating a distribution folder including the content changes; and generating one or more migration scripts based on at least the content changes, wherein the one or more migration scripts are executable to change the state of a target database to match a state of the repository.

14. The method of claim 13, wherein generating the one or more migration scripts comprises:

generating SQL commands for the one or more migration scripts based on the cross comparison between the feature branch and the target branch, wherein the cross comparison identifies how contents in the feature branch and contents in the target branch changed states.

15. The method of claim 13, wherein the distribution folder is generated to record the content changes and capture a state of objects over time that indicates an order of operations on the contents of the target branch over time.

16. The method of claim 13, wherein automatically controlling placement of the selected objects into the repository based on at least placement rules comprises:

accessing a config file that contains the placement rules;

loading the placement rules into a memory;

wherein the placement rules are defined to control how objects are placed in the repository and specify default locations in the repository for placing particular types of objects;

identifying one or more object types from the selected objects; and storing the selected objects into the repository in the default locations based on the one or more object types.

17. The method of claim 13, wherein executing the formatting function comprises:

parsing code from the selected objects to identify items that are designated for formatting by the formatting rules;

determining the items that do not comply with the formatting rules and reformatting the items into a designated format specified by the formatting rules;

wherein the reformatting reformats a particular type of code from the selected objects based on the designated format associated with the particular type of code; and wherein occurrences of the particular type of code that appears in multiple objects of the selected objects is reformatted to have a consistent format across the different objects.

* * * * *